(12) United States Patent
Scharles et al.

(10) Patent No.: US 11,790,778 B2
(45) Date of Patent: *Oct. 17, 2023

(54) CONNECTED-VEHICLE INTERFACE MODULE AND METHOD OF USE

(71) Applicant: Traffic and Parking Control Co., Inc., Brown Deer, WI (US)

(72) Inventors: Brian P. Scharles, Mukwonago, WI (US); Brian P. Scharles, Jr., Mukwonago, WI (US)

(73) Assignee: Traffic and Parking Control Co., Inc., Brown Deer, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,908

(22) Filed: Mar. 3, 2023

(65) Prior Publication Data

US 2023/0206758 A1 Jun. 29, 2023

Related U.S. Application Data

(63) Continuation of application No. 16/947,198, filed on Jul. 22, 2020, now Pat. No. 11,610,486.

(60) Provisional application No. 62/886,562, filed on Aug. 14, 2019.

(51) Int. Cl.
*G08G 1/0967* (2006.01)
*B60R 16/023* (2006.01)

(52) U.S. Cl.
CPC ..... *G08G 1/096783* (2013.01); *B60R 16/023* (2013.01); *G08G 1/096716* (2013.01); *G08G 1/0967* (2013.01); *G08G 1/096708* (2013.01)

(58) Field of Classification Search
None
See application file for complete search history.

*Primary Examiner* — Peter D Nolan
*Assistant Examiner* — Michael F Whalen
(74) *Attorney, Agent, or Firm* — James A. Joyce; Godfrey & Kahn, S.C.

(57) ABSTRACT

A connected-vehicle interface module is provided that includes a connected-vehicle controller, a wireless data connected-vehicle radio for receiving an activation signal indicating a road condition, and a connected-vehicle interface controller. The connected-vehicle interface controller including a microcontroller and a plurality of universal asynchronous receiver transmitters for receiving, transmitting, and processing data received by at least one of the connected-vehicle controller and the connected-vehicle radio, and communicated to the microcontroller via one or more wired connections; a memory device for storing program data, a transceiver and one or more communication ports, coupled to the microcontroller, for connection and communication with a connected vehicle road side unit, wherein the activation signal is communicated to the connected vehicle road side unit via the one or more communication ports, and at least one operator interface in communication with at least one of the connected-vehicle radio, the connected-vehicle interface controller, and the connected-vehicle controller.

9 Claims, 6 Drawing Sheets

CONNECTED-VEHICLE INTERFACE MODULE AND METHOD OF USE

CROSS-REFERENCE TO RELATED APPLICATION

This application claims priority to U.S. Provisional Patent Appl. No. 62/886,562 filed on Aug. 14, 2019, and is a continuation of U.S. Pat. No. 11,610,486 issued on Mar. 21, 2023, the disclosures of which are incorporated herein by reference in entirety for all purposes.

FIELD

The connected-vehicle interface module and method of use relate to the field of transportation safety, and more particularly to warning systems to enhance safety.

BACKGROUND

Various types of vehicle warning systems (e.g. Intelligent Warning Systems (IWS), Intelligent Transportation Systems (ITS), etc.) are commonly used to warn vehicle drivers of different types of road conditions, such as a pedestrian crossing the street, a vehicle traveling the wrong-way on a ramp, or an upcoming road that is flooded. As such, a vehicle warning system can be found in various locations, such as at pedestrian crosswalks, along one-way streets, at curves, etc. A vehicle warning system may use LED-enhanced signs, beacons, or other means to annunciate a specific condition to a driver. A vehicle warning system can be powered by a main AC power line, a solar panel and battery, or a combination of the two. Commonly a vehicle warning system may be installed a notable distance from a major intersection or other external power source, and therefore utilizes a solar panel and batteries due to the significant cost of installing an AC power line to the location. The use of batteries allows for cost effective installation of a vehicle warning system wherever needed, regardless of the availability of an AC power line.

In addition to various types of vehicle warning system, connected vehicle Road Side Units (RSU) have also become prevalent. An RSU communicates information to a connected vehicle using a form of Vehicle-to-everything (V2X) wireless communication, such as Dedicated Short-Range Communication (DSRC), Cellular Vehicle-to-Everything (C-V2X), etc. DSRC and C-V2X both use a 5.9 GHz radio, which operates on the reserved (5.9 GHz) spectrum for Intelligent Transportation Systems. An RSU also utilizes various additional radios, such as a Global Positioning System radio, a cellular radio for network communications, etc. As a result of the totality of the radios and other processing and communication devices found in an RSU, an RSU consumes a large amount of power. As such, RSU's are installed along with other traffic control devices requiring continuous dedicated AC power, such as traffic signal lights.

RSUs were designed around the idea of using a traffic signal controller to provide the data and communication to the RSU of what state the system is in, when it is active, and what the RSU should be communicating to vehicles. When the RSU is used at a signalized intersection, it does not pose an issue, because there is already a traffic signal controller and power present. However, if an RSU was desired for a different application, such as for a vehicle warning systems at a midblock crosswalk or a flood warning, generally an entire traffic signal controller would need to be installed to receive the input activating the system (e.g., a pedestrian pressing a button) and communicate this to the RSU in addition to having to install AC power. At these installations, the RSU installation generally includes the addition of a large cabinet and an AC power line connected to the vehicle warning system, and due to the need for an RSU, a traffic signal controller, an activation device, and warning lights to all be on the same pole, these systems have high power requirements that are not conducive with a battery and solar power energy source. These systems are also not cost effective, due to the need for a traffic signal controller and the cabinet and hardware to support it. The high power consumption and need for a traffic signal controller have limited the ability to use RSUs with various types of the warning systems.

BRIEF DESCRIPTION OF THE DRAWINGS

Embodiments of the connected-vehicle interface module and method of use are disclosed with reference to the accompanying drawings and are for illustrative purposes only. The method and apparatus is not limited in its application to the details of construction or the arrangement of the components illustrated in the drawings. The method and apparatus are capable of other embodiments or of being practiced or carried out in other various ways. In the drawings.

BRIEF SUMMARY

Figure 1:
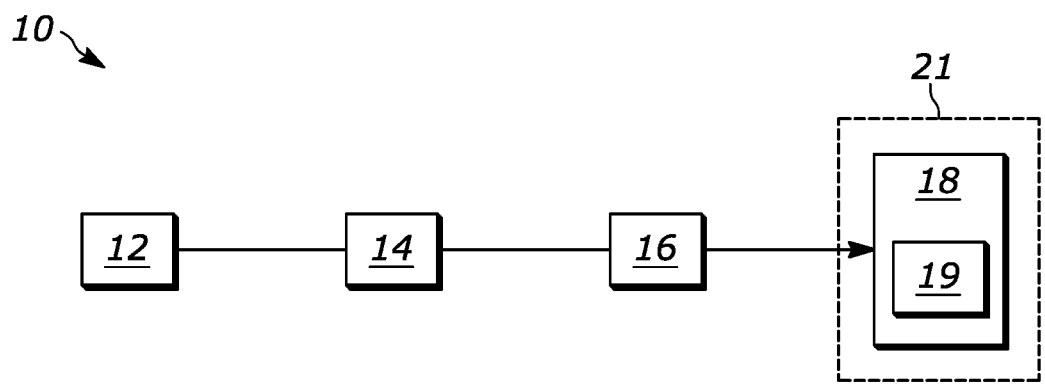
FIG. 1 illustrates a block diagram of an exemplary connected vehicle communication system.

In at least some embodiments, a connected-vehicle interface module is disclosed that includes: a connected-vehicle controller; a wireless data connected-vehicle radio for receiving an activation signal from a first vehicle warning system controller indicating a road condition; a connected-vehicle interface controller further comprising: a microcontroller and a plurality of universal asynchronous receiver transmitters for receiving, transmitting, and processing data received by at least one of the connected-vehicle controller and the connected-vehicle radio, and communicated to the microcontroller via one or more wired connections; a memory device in communication with the microcontroller for storing program data; and an ethernet transceiver and communication port, coupled to the microcontroller, for connection and communication with a connected vehicle road side unit, wherein the activation signal is communicated to the connected vehicle road side unit via the communication port; and at least one operator interface in communication with at least one of the connected-vehicle radio, the connected-vehicle interface controller, and the connected-vehicle controller.

In at least some other embodiments, a connected-vehicle interface module is disclosed that includes: a connected-vehicle controller; a wireless data connected-vehicle radio; a connected-vehicle interface controller further comprising: a microcontroller and a plurality of universal asynchronous receiver transmitters for receiving, transmitting, and processing data received by at least one of the connected-vehicle controller and the connected-vehicle radio, and communicated to the microcontroller via one or more wired connections; a memory device in communication with the microcontroller; and an ethernet transceiver and communication port, coupled to the microcontroller, for connection and communication with a connected vehicle road side unit; at least one operator interface in communication with at least one of the connected-vehicle radio, the connected-vehicle controller, and the connected-vehicle interface controller, wherein the connected-vehicle interface controller is coupled to a sensor for detecting a road condition, and wherein the connected-vehicle interface controller generates an activation signal upon detection of the road condition by the sensor and communicates the activation signal to the connected vehicle road side unit via the communication port.

In at least yet some other embodiments, a method of communicating a sensed condition on a roadway to a driver is disclosed that includes: sensing a condition on the roadway using a sensor in communication with a vehicle warning system controller; activating an annunciator via the vehicle warning system controller; wirelessly transmitting an activation signal from the vehicle warning system controller; receiving the activation signal at a connected-vehicle interface module; communicating the activation signal to a connected vehicle road side unit via a wired connection from the connected-vehicle interface module to the connected vehicle road side unit; and transmitting via the connected vehicle road side unit, the activation signal to an in-vehicle interface device for annunciation to the driver.

In at least yet some further embodiments, a communication system is disclosed that includes: a connected vehicle road side unit; and a housing enclosing a power supply for the connected vehicle road side unit and a connected-vehicle interface module, the connected-vehicle interface module further comprising: a connected-vehicle controller; a wireless data connected-vehicle radio for receiving an activation signal indicating a road condition; a microcontroller and a plurality of universal asynchronous receiver transmitters for receiving, transmitting, and processing data received by at least one of the connected-vehicle controller and the connected-vehicle radio, and communicated to the microcontroller via one or more wired connections; a memory device in communication with the microcontroller for storing program data; at least one configuration interface in communication with at least one of the connected-vehicle radio, the microcontroller, and the connected-vehicle controller; and an ethernet transceiver and communication port for connection and communication with the connected vehicle road side unit, wherein the activation signal is communicated to the connected vehicle road side unit via an ethernet cable coupled to the communication port.

Other embodiments, aspects, features, objectives and advantages of the method and apparatus will be understood and appreciated upon a full reading of the detailed description and the claims that follow.

DETAILED DESCRIPTION

Referring to FIG. 1, a block diagram of an exemplary connected vehicle communication system 10 is provided. In at least some embodiments, as shown in FIG. 1, the connected vehicle communication system 10 can include a vehicle warning system 12, a connected-vehicle interface module 14, a connected vehicle road side unit 16, and an in-vehicle interface device 18. The connected vehicle communication system 10 senses and communicates various warnings to vehicle drivers to alert them to different types of road conditions, such as a pedestrian crossing the street, a vehicle traveling the wrong-way on a ramp, or that an upcoming road is flooded. In at least some embodiments, the vehicle warning system 12 is known in the industry as an Intelligent Warning System (IWS), Intelligent Transportation System (ITS), Traffic Safety Solution, etc. The vehicle warning system 12 is generally installed on a roadway at a point where a road condition (e.g., potentially hazardous road condition) is to be monitored, such as a crosswalk, a bridge, a one-way street, a flood zone, etc. The vehicle warning system 12 can include various components to sense when a hazardous road condition is present and then provide an activation signal, which is generally used to initiate a visual annunciation to oncoming vehicle drivers, such as flashing lights, beacons, etc.

Figure 2:
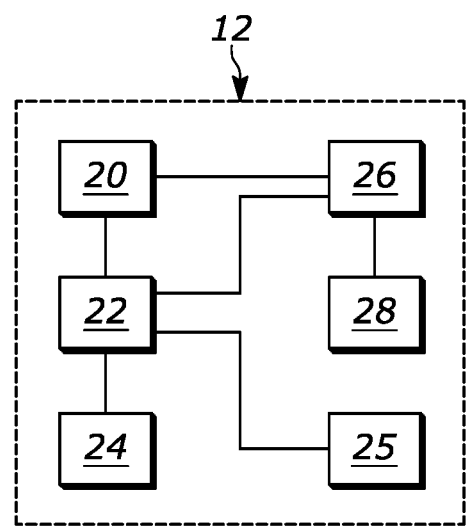
FIG. 2 illustrates a block diagram of an exemplary vehicle warning system of FIG. 1.

Referring to FIG. 2, a block diagram of the exemplary vehicle warning system 12 is provided. The vehicle warning system 12 can be comprised of several components, including a wireless data radio, such as warning system radio 20, a warning system controller 22, one or more road condition sensors 24, and an annunciator 25 (e.g., flashing lights, beacons, etc.). The vehicle warning system 12 can be powered using AC power when a power line is available, although when AC power is not available, or backup power is desired, the vehicle warning system 12 can include other power sources, such as one or more batteries 26, one or more solar panels 28, etc. In at least some embodiments, the warning system radio 20 includes a microprocessor and a transceiver configured to communicate via one or more specific frequencies, such as 900 MHz and can further include digital inputs and outputs, a display, and an operator interface, such as a surface mounted joystick or Universal Serial Bus (USB) port, although other operating frequencies and radio features can be utilized in addition to or in place of the aforementioned. The warning system radio 20 can be utilized to provide communication between a plurality of vehicle warning systems 12. A BlinkerBeam Wireless Radio P/N 135291 as manufactured by TAPCO located in Brown Deer, Wisconsin, is one example of the components and features that can be included in the warning system radio 20.

The warning system controller 22 is coupled at least indirectly with the warning system radio 20 and provides various functions and as such, in at least some embodiments, can include a microprocessor and circuitry that provides a light flasher, a solar panel charging unit regulator, battery charging circuitry, a scheduled timer, programming inputs (e.g., serial RS232 port, cellular modem, etc.) a clock, a flasher timer, input ports for interconnecting different types of sensors 24, output ports for powering annunciators 25 and communication protocols to send activation signals (e.g., via the warning system radio 20) to other warning system controllers 22 (in other vehicle warning systems 12) to coordinate annunciation actions, such as sequential or concurrent illumination of annunciators located in various locations. An IWS Controller P/N 135232 as manufactured by TAPCO located in Brown Deer, Wisconsin is one example of the components and features that can be included in the warning system controller 22. The battery 26 can include any one of various types of known batteries to provide the desired level of power, such as a rechargeable lithium polymer or nickel metal hydride battery (Ni-MH), etc. One exemplary battery can include P/N UB12350, as manufactured by UPG located in Carrollton, Texas. The solar panel 28 can include any one of various types of known solar panels sized to provide sufficient supply/charging power to the battery 26, such as P/N SPM085P-TS-N, as manufactured by SolarTech Power located in Ontario, Canada.

The various aforementioned components of the vehicle warning system 12 are generally housed in a single cabinet and can be mounted on a pole in the area where the potentially hazardous road condition resides. The sensors 24 are connected to the warning system controller 22 and are configured to sense a particular type of road condition, such as a pedestrian crossing the street, a vehicle traveling the wrong-way on a ramp, an upcoming road that is flooded, a vehicle on the road, ice on the road, moisture on the road, a construction hazard, an irregular pavement condition, etc., and therefore can include any of various types of sensors, for example, a radar speed sensor, a vehicle presence sensor, an ice detection sensor, a moisture detection sensor, a radar direction sensor, a vehicle height sensor, a weather sensor, thermal detection sensor, an ambient temperature sensor, a flood water sensor, a pedestrian detection sensor, etc. The various types of sensors 24 used to detect potentially hazardous road conditions are well known and can be active or passive, as well as direct (e.g., a cross-walk pushbutton). The sensors 24 can be hardwired to the warning system controller 22 or can communicate wirelessly with the warning system radio 20.

Figure 3:
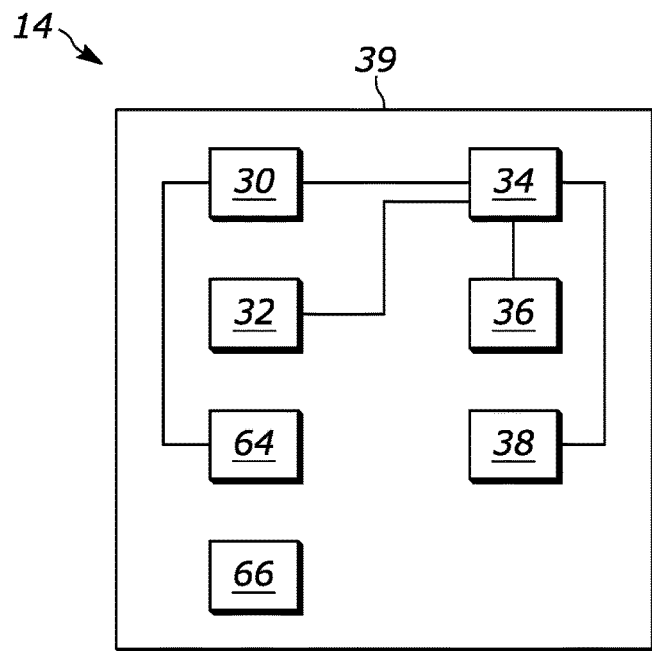
FIG. 3 illustrates a block diagram of an exemplary connected-vehicle interface module of FIG. 1.

Referring to FIG. 3, a block diagram of the exemplary connected-vehicle interface module 14 is provided. The connected-vehicle interface module 14 can be comprised of several components, and in at least some embodiments includes a wireless data radio, such as a connected-vehicle radio 30, a connected-vehicle controller 32, and a connected-vehicle interface controller 34. In at least some embodiments, the connected-vehicle radio 30 and connected-vehicle controller 32 are identical respectfully to the warning system radio 20 and warning system controller 22 found in the vehicle warning system 12, although in some embodiments they can differ in form and/or function having the same or different components and features. As such, a BlinkerBeam Wireless Radio P/N 135291 as manufactured by TAPCO located in Brown Deer, Wisconsin, is one example of the components and features that can be included in the connected-vehicle radio 30, and an IWS Controller P/N 135232 as manufactured by TAPCO located in Brown Deer, Wisconsin is one example of the components and features that can be included in the connected-vehicle controller 32.

Figure 4:
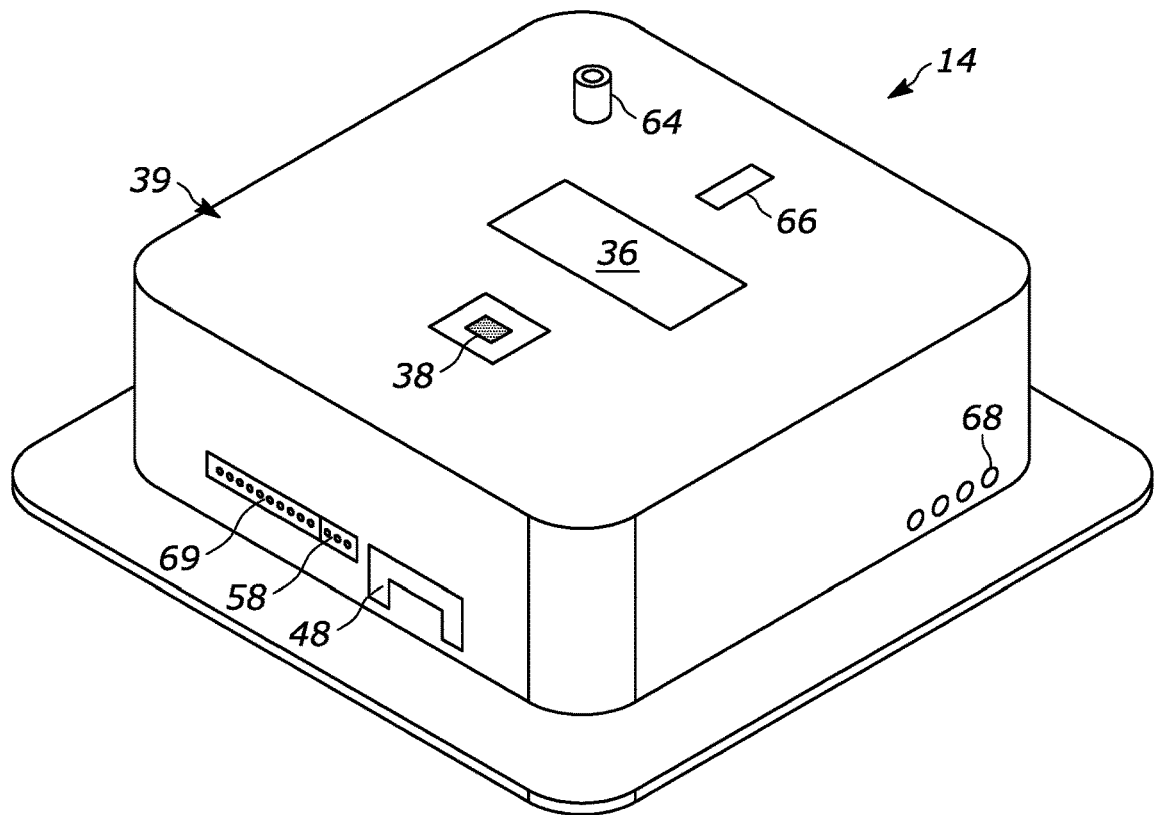
FIG. 4 illustrates an exemplary perspective view of the connected-vehicle interface module of FIG. 3.

In at least some embodiments, the connected-vehicle interface module 14 further includes a display 36 and an operator interface 38. The operator interface 38 can in at least some embodiments, include a peripheral device (e.g., a joystick, buttons, etc.) and/or a peripheral port for connection with another device for programming or setup by an operator. The display 36 can provide information regarding the operation and/or status of the connected-vehicle interface module 14, as well as display menus and other information while an operator is utilizing the operator interface 38. The connected-vehicle interface module 14 can include a housing 39 having various external connections, as discussed below. FIG. 4 provides an exemplary illustration of the connected-vehicle interface module 14 in the exemplary housing 39.

Referring again to FIG. 1, in at least some embodiments, the connected-vehicle interface module 14 serves to couple a vehicle warning system 12 to a road side unit 16, with the road side unit 16 receiving activation signals (indicating hazardous road condition warnings) from the connected-vehicle interface module 14 and then communicating them to the in-vehicle interface device 18 of a connected vehicle 21 (i.e., a vehicle that is configured for communication with a road side unit or a network that receives information from a road side unit). The road side unit 16 is a well-known device that includes various inputs and outputs, including an ethernet input port to communicate with other devices and one or more radios to send data to in-vehicle interface devices 18. In at least some embodiments, exemplary road side units 16 can include P/N RIS-9260 as manufactured by KAPSCH in Vienna, Austria and P/N ESCoS as manufactured by SEIMENS in Austin, Texas. Further, in at least some embodiments, the connected-vehicle interface module 14 is installed in the same cabinet as the power supply for road side unit 16 and can therefore derive operational power from the same power source as the road side unit 16, whether this power source is AC mains power or large solar panel and batteries, although in some embodiments, the connected-vehicle interface module 14 can utilize a different power source, such as its own battery and solar panel, similar to the battery 26 and solar panel 28 found in the vehicle warning system 12. In at least some embodiments, the road side unit 16 is located proximate to the connected-vehicle interface module 14, such as mounted on the same structure (e.g., a pole, building, etc.).

In at least some embodiments, the in-vehicle interface device 18 shall be understood to include a device situated in a vehicle that can receive directly or indirectly (e.g., via a network in communication with the road side unit 16) from the road side unit 16, information provided to the road side unit 16 by the connected-vehicle interface module 14, and which originated from the vehicle warning system 12. Generally, the in-vehicle interface device 18 includes a receiver 19 configured to communicate directly with the road side unit 16 or a network that is in communication with the road side unit 16. Such communication can occur using known protocols and transmission methods, for example Dedicated Short-Range Communication (DSRC), Cellular Vehicle-to-Everything (C-V2X), Vehicle-to-everything (V2X) wireless communication, although other types of communication can be utilized as well. In at least some embodiments, the in-vehicle interface device 18 is an On-Board Unit (OBU), for example P/N MW2000 as manufactured by SAVARI OF Farmington Hills, Michigan.

Figure 5:
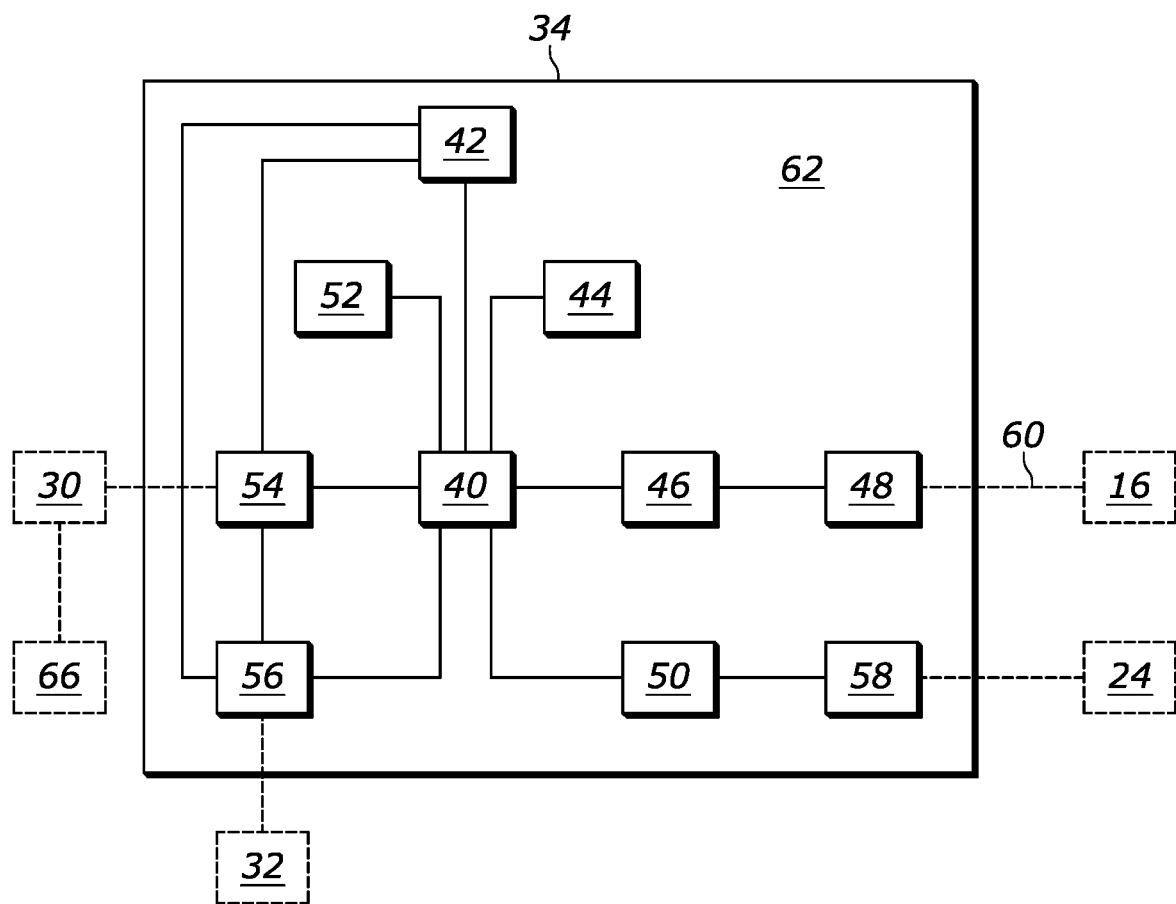
FIG. 5 illustrates a block diagram of an exemplary connected-vehicle interface controller of the connected-vehicle interface module of FIG. 3.

Referring to FIG. 5, a block diagram of the exemplary connected-vehicle interface controller 34 is provided. In at least some embodiments, the connected-vehicle interface controller 34 includes a microcontroller 40 and a plurality of universal asynchronous receiver transmitters 42 for receiving, transmitting, and processing data received by the connected-vehicle controller 32 and connected-vehicle radio 30. In at least some embodiments the microcontroller 40 can be a P/N STM32F207ZGT7 as manufactured by ST MICROELECTRONICS of Shanghai, China, and the universal asynchronous receiver transmitters 42 can be a P/N SN74LVC2G14DCKR, as manufactured by TEXAS INSTRUMENTS of Dallas, Texas. In at least some embodiments, the connected-vehicle interface controller 34 can further include, a memory device 44, ethernet transceiver 46, an RJ45 connector 48, an I/O buffer 50, a voltage regulator 52, a radio connection port 54, a connected-vehicle controller connection port 56, and a sensor input port 58. The memory device 44 can include various types of known memory, such as an EEPROM (e.g. a 32-Kbit serial SPI bus EEPROM). The memory device 44 is used for storing program data, application settings, and device configuration. The ethernet transceiver 46 (e.g., P/N LAN8742A-CZ-TR as manufactured by MICROCHIP TECHNOLOGY of Chandler, Arizona) is coupled with the microcontroller 40 and the RJ45 connector 48, and is utilized to communicate directly with the road side unit 16 via ethernet.

Figure 6:
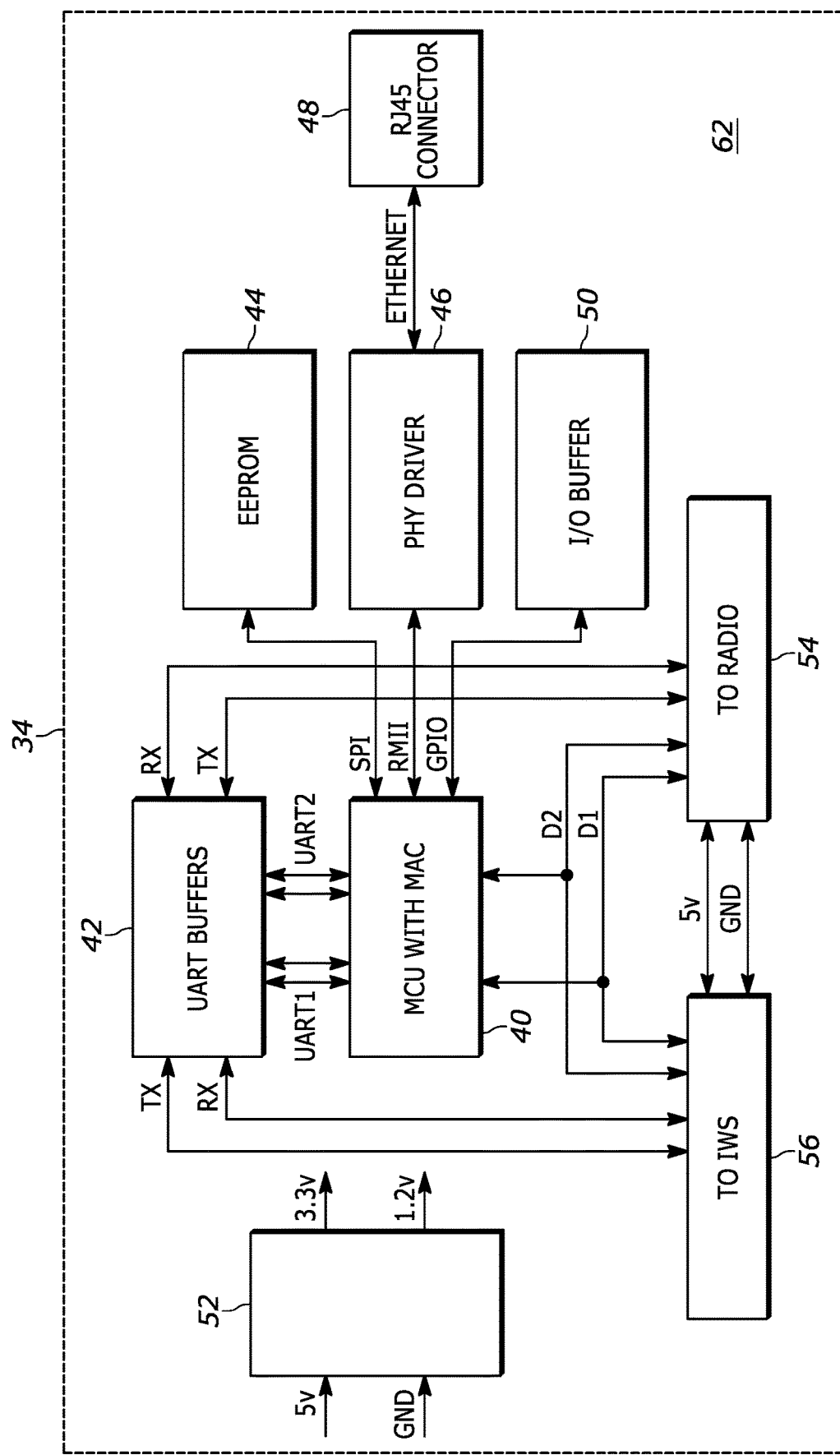
FIG. 6 illustrates a block diagram of another exemplary connected-vehicle interface controller of the connected-vehicle interface module of FIG. 3.

An ethernet cable 60 can used to directly connect the connected-vehicle interface module 14 to the road side unit 16, although if desired, the ethernet cable 60 can be connected to a known wireless broadband or cellular router (not shown), to provide a wireless connection to the road side unit 16, which is connected via a matching router. Further, the coupling of the connected-vehicle interface module 14 to the road side unit 16 can be accomplished using various other known methods of communication. The voltage regulator 52 can include any of various known voltage regulators, although in at least some embodiments, the voltage regulator 52 can be a low dropout regulator, such as a P/N TPS70612DBVR, as manufactured by TEXAS INSTRUMENTS of Dallas, Texas. The voltage regulator 52 can receive regulated power from an AC powered DC power supply or the battery 26. The I/O buffer 50 serves to buffer activation signals passing to the microcontroller 40 from sensors 24 connected directly via the sensor input port 58 and can include any of various known I/O buffers, for example P/N SN74LVC2G17DCKR, as manufactured by TEXAS INSTRUMENTS of Dallas, Texas. The radio connection port 54 couples the connected-vehicle radio 30 with the connected-vehicle interface controller 34 using any of various connecting methods, although in at least some embodiments, it is configured to receive a ribbon cable connector that attaches to the connected-vehicle radio 30 to provide a communication link therebetween. Similarly, the connected-vehicle controller connection port 56 couples the connected-vehicle controller 32 with the connected-vehicle interface controller 34 using any of various connecting methods, although in at least some embodiments, it is configured to receive a ribbon cable connector that attaches to the connected-vehicle controller 32 to provide a communication link therebetween. The aforementioned components of the connected-vehicle interface controller 34 can in at least some embodiments, be provided on a single or multiple circuit boards 62. Although various configurations of the connected-vehicle interface controller 34 are contemplated, FIG. 6 is additionally provided as one exemplary embodiment of the connected-vehicle interface controller 34 shown in FIG. 5.

In at least some embodiments, The connected-vehicle interface module 14 is encased in the housing 39 and is intended to be mounted inside a cabinet, along with equipment to power the road side unit 16 that it is paired with. The connected-vehicle interface module 14 connects to and communicates with the road side unit 16. In at least some embodiments, the connected-vehicle interface module 14 includes a backlit, multi-line LCD display, four status LEDs, and a joystick for navigating a menu for the connected-vehicle radio 30, reviewing system status, and making changes to connect the connected-vehicle radio 30 with other warning system radios 20 included in the connected vehicle communication system 10.

The connected-vehicle interface module 14 can further include an antenna connector 64 for coupling a wireless antenna. As noted above, the operator interface 38 can include multiple peripherals, including a USB port 66 on the housing 39 that can be used to connect to the connected-vehicle radio 30 for device diagnostics and updates. The housing 39 can further include a plurality of status LEDs 68, which can indicate power, communication and activation status of the connected-vehicle interface module 14. In addition, power can be received in any of various manners, for example, a power port 69 can be provided for providing power to the connected-vehicle interface module 14, wherein in at least some embodiments, the power port 69 is coupled directly to the connected-vehicle controller 32, which in turn provides power to the connected-vehicle radio 30 and the connected-vehicle interface controller 34. In at least some embodiments, the sensor input port 58 can be integral or adjacent to the power port 69.

Figure 7:
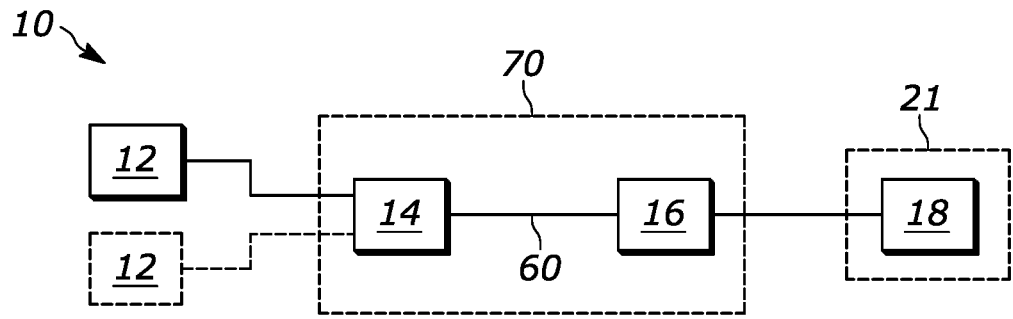
FIG. 7 illustrates another exemplary embodiment of the connected vehicle communication system of FIG. 1.
Figure 8:
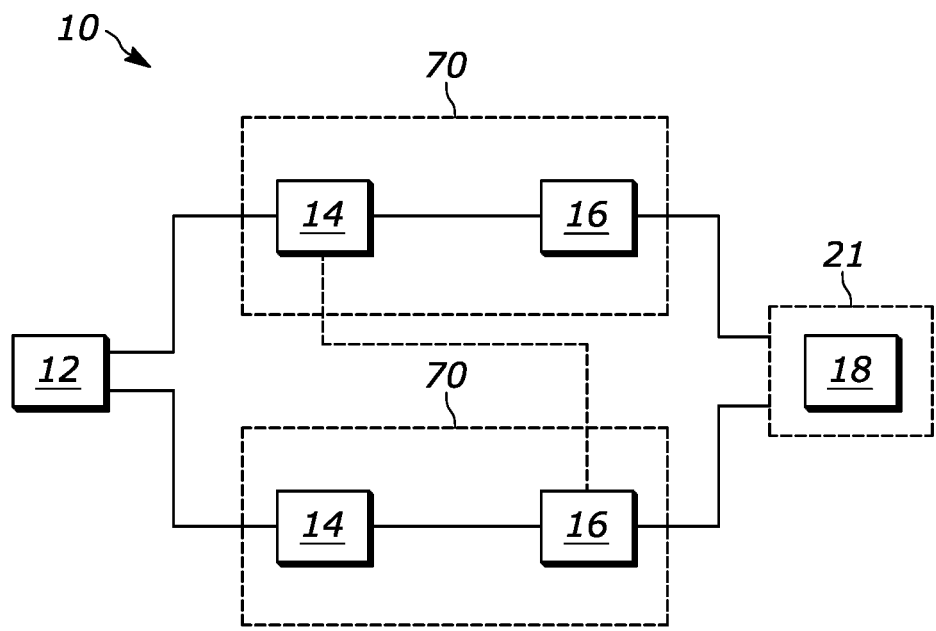
FIG. 8 illustrates yet another exemplary embodiment of the connected vehicle communication system of FIG. 1.
Figure 9:
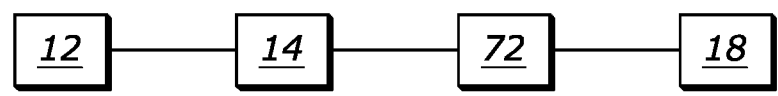
FIG. 9 illustrates yet still another exemplary embodiment of the connected vehicle communication system of FIG. 1.

Referring to FIGS. 7, 8, and 9 the connected-vehicle interface module 14 provides flexibility for numerous connected vehicle communication system configurations, which can vary depending on the available equipment, available power, and distance between components. In at least some embodiments, one or more vehicle warning systems 12 are installed at one or more different locations, each powered by either an AC main or solar panels and batteries. The road side unit 16 is installed on a nearby structure. The exact location of the road side unit 16 is not critical, as long as the road side unit 16 communication extends far enough that in-vehicle interface devices 18 can receive messages in the desired range. The road side unit 16 is connected via ethernet connection (e.g., ethernet cable 60) to the connected-vehicle interface module 14, which can be housed in a cabinet 70 mounted on the same pole as the road side unit 16 (or in a separate location distanced from the road side unit 16). In at least some embodiments, the road side unit 16 can be mounted in the cabinet 70 with the connected-vehicle interface module 14. The cabinet can also house power equipment, such as an AC circuit breaker, lightning arrester, solar charger, etc., as well as a power source for the road side unit 16, such as a Power Over Ethernet (POE) connection.

When the vehicle warning system 12 is activated (by a potentially hazardous road condition being sensed), the associated annunciator 25 is activated to visually warn drivers of the condition. In addition, the vehicle warning system 12 generates an activation signal that will be transmitted wirelessly over the warning system radio 20 from the warning system controller 22 to all other warning system controllers 22 with warning system radios 20 configured for communication on the same network. Since the connected-vehicle radio 30 is configured for communication on the same network, it would receive the activation signal wirelessly. Once the connected-vehicle radio 30 receives the activation signal, it will communicate this activation signal (indicating the vehicle warning systems 12 is in active status) over the ethernet cable 60 to the road side unit 16 via known standard communication protocols, such as NTCIP 1202, SAE J2735, etc. It shall be understood that in at least some embodiments, the term "activation signal" is representative of one or more forms depending on the source and receiver, for example, in one form the activation signal can include a hi or lo bit transmitted in a digital signal, while in other forms, it can include a text message detailing a specific hazardous road condition, while in yet other forms, it can include a set pattern of data sent over a wireless radio link. When the road side unit 16 receives the signal from the connected-vehicle interface module 14 indicating that the vehicle warning system 12 has been activated, it will start broadcasting standard messages based on the type of vehicle warning system (i.e., pedestrian in the crosswalk, wrong-way vehicle detected, etc.), warning drivers of connected vehicles 21 of the hazardous road condition. Connected vehicles 21 (e.g., vehicles with an in-vehicle interface device 18) will receive these messages when they are within communication range of the road side unit 16 (or are otherwise determined by a network to be near the detected hazardous road condition, in the case where the vehicle interface device 18 is connected to a network (e.g., cellular) that is broadcasting activation signals received from a road side unit 16), and will be able to display a warning message to the driver. The exact display of the message is highly dependent on various things, such as the brand of vehicle or the manufacturer of the in-vehicle interface device 18, although in at least some embodiments, the message sent to the connected vehicles 21 will follow SAE standards, so that it can be correctly received by any in-vehicle interface device 18 that is following the same messaging standards.

If multiple road side units 16 were to be associated with a single vehicle warning system 12, such as illustrated in FIG. 8, the wireless communication capabilities of the connected-vehicle interface module 14 allow each road side unit 16 and connected-vehicle interface module 14 pair to be placed wherever is convenient, such as on existing structures with AC power. When an activation signal is generated by the vehicle warning system 12, all road side units 16 would start sending messages to connected vehicles 21 as programmed, because all the connected-vehicle interface modules 14 are connected through wireless radio communication back to the warning system controllers 22. In addition, if each location where a road side unit 16 was to be mounted had a network connection run to it, the road side units 16 can be connected to a network and activated through that network from a single connected-vehicle interface module 14; however, a network connection is not required, so if an installation does not have a network connection run to each mounting location already, it would not be required to run network communication in order to utilize multiple road side units 16 to send hazardous road condition alerts for a single activation signal. Further, additional connected-vehicle interface module 14 and road side unit 16 pairs could receive an activation signal directly from the first connected-vehicle interface module 14 and road side unit 16 pair, as opposed to the vehicle warning system 12, which can be advantageous when the second connected-vehicle interface module 14 and road side unit 16 pair is out of range of the vehicle warning system 12, but within range of the first connected-vehicle interface module 14 and road side unit 16 pair.

Referring to FIG. 9, another embodiment of the connected vehicle communication system 10 is illustrated, wherein the vehicle warning system 12 communicates the activation signal to the connected-vehicle interface module 14, and the connected-vehicle interface module 14 sends the activation signal to a network 72, which then transmits the activation signal to an in-vehicle interface device 18. Communication between the components can include various known communication methods, such as cellular communication. This configuration is useful when for example a road side unit 16 cannot be easily coupled with the connected-vehicle interface module 14. The term "network" is intended to encompass known systems of computers, transmitters, and receivers that are dedicated to receiving and processing information from various devices (e.g. traffic controllers, road side units, etc.) that inform the network of various road conditions, wherein the network is configured to broadcast the information to connected vehicles 21 using one or more known communication methods, such as cellular towers, etc.

The connected-vehicle interface module 14 solves numerous challenges of enhancing a vehicle warning system with a road side unit. For example, it connects directly to the road side unit 16 and communicates activation status of the warning system via standard communication protocols, thereby eliminating the need to have a traffic signal controller connected to the road side unit 16. The connected-vehicle interface module 14 receives the activation signal from the vehicle warning system 12 wirelessly through radio communication with the other warning system controllers 22. This allows the connected-vehicle interface module 14 and road side unit 16 to be mounted on a pole or structure that has AC power or a large solar panel 28, separate from where the vehicle warning system 12 is mounted. Such a pole or structure could be a nearby street light pole, a nearby traffic signal pole, or even on a nearby building. Because the connected-vehicle interface module 14 and road side unit 16 are mounted and powered on a separate structure and communicate wirelessly with the warning system controller 22, the vehicle warning system 12 does not require any changes to its solar panel 28, its battery 26 for power, or its cabinet size to house extra equipment. A vehicle warning system 12 already installed in the field can be upgraded without having to add any equipment to the current poles, only needing to mount the connected-vehicle interface module 14 cabinet and road side unit 16 to a nearby structure with AC power or a large solar panel 28 and battery 26.

Road side units 16 in conformance with the US Department of Transportation's standards specification have an ethernet port for communication, so the connected-vehicle interface module 14 will interface with all standard road side units 16. In at least some embodiments, the connected-vehicle interface module 14 can include other known communication methods in addition to or in place of ethernet, to communicate with road side units 16, such as BLUETOOTH, WI-FI, etc. The connected-vehicle interface module 14 is designed to be flexible and communicate with multiple manufacturers of road side units 16. While all road side units 16 follow the same basic standards, they have different methods of receiving activation to start sending messages. In at least some embodiments, the connected-vehicle interface module 14 is agnostic and therefore support for different road side unit 16 manufacturers is possible, and can be easily expanded through software updates. Due to the flexibility of the connected-vehicle interface module 14 to communicate with a variety of road side units 16 from different manufacturing brands, users can add the connected-vehicle interface module 14 to an existing or even planned installation, even if they have not yet decided on a particular brand or model of road side unit 16. The road side unit 16 can be added to the system when chosen, and any changes necessary to allow the connected-vehicle interface module 14 to communicate with the road side unit 16 would be purely software related, which can be addressed using software updates, something an operator can easily do even when the device is installed.

Figure 10:
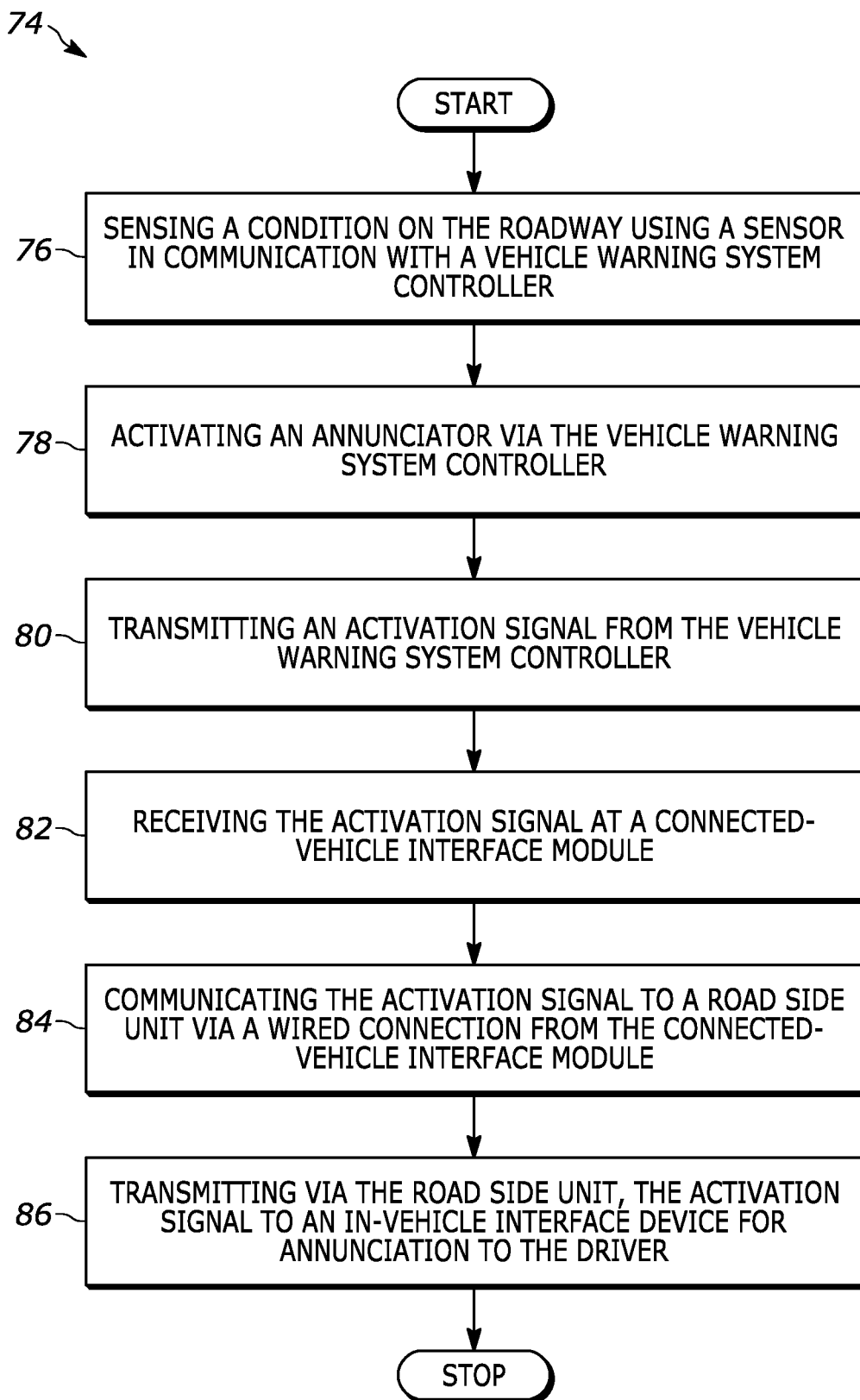
FIG. 10 illustrates a flow chart that represents an exemplary method of using the connected vehicle communication system of FIG. 1.

The connected vehicle communication system 10 can be utilized in various methods to communicate a sensed condition on a roadway to a driver, one exemplary method is illustrated in flow chart 74 as shown in FIG. 10 and includes: sensing a condition on the roadway using a sensor 24 in communication with a vehicle warning system controller 22 at step 76; activating an annunciator 25 via the vehicle warning system controller 22 at step 78; transmitting an activation signal from the vehicle warning system controller 22 at step 80; receiving the activation signal at a connected-vehicle interface module at step 82; the activation signal to road side unit 16 via a wired connection from the connected-vehicle interface module 14 at step 84; and transmitting via the road side unit 16, the activation signal to an in-vehicle interface device 18 for annunciation to the driver at step 86.

All exemplary components listed herein by a specific P/N (part number) are publically available, with their composition, function, and capabilities apparent to those skilled in the art, and are herein incorporated by reference in their entirety. It is specifically intended that the connected-vehicle interface module and method of use is not to be limited to the embodiments and illustrations contained herein, but include modified forms of those embodiments including portions of the embodiments and combinations of elements of different embodiments as come within the scope of the following claims. Further, the steps described herein with reference to the method of operation (processes) are not to be considered limiting and can include variations, such as additional steps, removed steps, and re-ordered steps.

We claim:

1. A connected-vehicle interface module comprising:
a connected-vehicle controller;
a wireless data connected-vehicle radio for receiving an activation signal from a first vehicle warning system controller indicating a road condition;
a connected-vehicle interface controller comprising:
a microcontroller and a plurality of universal asynchronous receiver transmitters for receiving, transmitting, and processing data received by at least one of the connected-vehicle controller and the connected-vehicle radio, and communicated to the microcontroller via one or more wired connections;
a memory device in communication with the microcontroller for storing program data;
a transceiver and one or more communication ports, coupled to the microcontroller, for connection and communication with a connected vehicle road side unit, wherein the activation signal is communicated to the connected vehicle road side unit via the one or more communication ports; and
at least one operator interface in communication with at least one of the connected-vehicle radio, the connected-vehicle interface controller, and the connected-vehicle controller.

2. The connected-vehicle interface module of claim 1, wherein the activation signal is received from the first vehicle warning system controller during activation of a first vehicle warning system.

3. The connected-vehicle interface module of claim 2, wherein the first vehicle warning system includes a sensor comprising of at least one of a radar speed sensor, a vehicle presence sensor, a radar direction sensor, a vehicle height sensor, an ice detection sensor, a moisture detection sensor, a thermal detection sensor, a pedestrian detection sensor, and a water level sensor.

4. The connected-vehicle interface module of claim 1, wherein the connected vehicle road side unit is located proximate to the connected-vehicle interface module.

5. A connected-vehicle interface module comprising:
a connected-vehicle controller;
a wireless data connected-vehicle radio;
a connected-vehicle interface controller comprising:
a microcontroller and a plurality of universal asynchronous receiver transmitters for receiving, transmitting, and processing data received by at least one of the connected-vehicle controller and the connected-vehicle radio, and communicated to the microcontroller via one or more wired connections;
a memory device in communication with the microcontroller; and
one or more communication ports, coupled to the microcontroller, for connection and communication with a connected vehicle road side unit;
at least one operator interface in communication with at least one of the connected-vehicle radio, the connected-vehicle controller, and the connected-vehicle interface controller,
wherein the connected-vehicle interface controller is coupled to a sensor for detecting a road condition, and wherein the connected-vehicle interface controller generates an activation signal upon detection of the road condition by the sensor and communicates the activation signal to the connected vehicle road side unit.

6. The connected-vehicle interface module of claim 5, wherein the sensor is one of a radar speed sensor, a radar direction sensor, an ice detection sensor, a moisture detection sensor, a vehicle presence sensor, a vehicle height sensor, a thermal detection sensor, a pedestrian detection sensor, and a water level sensor.

7. The connected-vehicle interface module of claim 5, wherein the connected vehicle road side unit is located proximate to the connected-vehicle interface controller.

8. A method of communicating a sensed condition on a roadway to a driver comprising:
sensing a condition on the roadway using a sensor in communication with a vehicle warning system controller;
activating an annunciator via the vehicle warning system controller;
transmitting an activation signal from the vehicle warning system controller;
receiving the activation signal at a connected-vehicle interface module;
communicating the activation signal to a connected vehicle road side unit; and
transmitting via the connected vehicle road side unit, the activation signal to an in-vehicle interface device for annunciation to the driver.

9. A communication system comprising:
a connected vehicle road side unit; and
a housing enclosing a power supply for the connected vehicle road side unit and a connected-vehicle interface module, the connected-vehicle interface module comprising:
a connected-vehicle controller;
a wireless data connected-vehicle radio for receiving an activation signal indicating a road condition;
a microcontroller and a plurality of universal asynchronous receiver transmitters for receiving, transmitting, and processing data received by at least one of the connected-vehicle controller and the connected-vehicle radio, and communicated to the microcontroller via one or more wired connections;
a memory device in communication with the microcontroller for storing program data;
at least one configuration interface in communication with at least one of the connected-vehicle radio, the microcontroller, and the connected-vehicle controller; and an ethernet transceiver for connection and communication with the connected vehicle road side unit, wherein the activation signal is communicated to the connected vehicle road side unit via an ethernet cable coupled to the communication port.

\* \* \* \* \*